US009413676B2

(12) United States Patent
Bandyopadhyay et al.

(10) Patent No.: US 9,413,676 B2
(45) Date of Patent: Aug. 9, 2016

(54) SYSTEM AND METHOD FOR REDUCING THE DATA PACKET LOSS EMPLOYING ADAPTIVE TRANSMIT QUEUE LENGTH

(75) Inventors: Soma Bandyopadhyay, West Bengal (IN); Shameemraj M. Nadaf, West Bengal (IN)

(73) Assignee: Tata Consultancy Services Limited, Maharashtra (IN)

(*) Notice: Subject to any disclaimer, the term of this patent is extended or adjusted under 35 U.S.C. 154(b) by 169 days.

(21) Appl. No.: 14/119,039

(22) PCT Filed: May 22, 2012

(86) PCT No.: PCT/IN2012/000363
§ 371 (c)(1),
(2), (4) Date: Nov. 20, 2013

(87) PCT Pub. No.: WO2013/054335
PCT Pub. Date: Apr. 18, 2013

(65) Prior Publication Data
US 2014/0078900 A1    Mar. 20, 2014

(30) Foreign Application Priority Data

May 24, 2011 (IN) .......................... 1559/MUM/2011

(51) Int. Cl.
H04L 12/873 (2013.01)
H04L 12/863 (2013.01)
(52) U.S. Cl.
CPC ........... *H04L 47/522* (2013.01); *H04L 47/6215* (2013.01)
(58) Field of Classification Search
None
See application file for complete search history.

(56) References Cited

U.S. PATENT DOCUMENTS

| 7,069,356 | B2 | 6/2006 | Meyer et al. |
| 7,099,273 | B2 | 8/2006 | Ha et al. |
| 7,688,752 | B2 | 3/2010 | Cho et al. |
| 7,693,052 | B2 | 4/2010 | Jin et al. |
| 7,706,261 | B2 | 4/2010 | Sun et al. |
| 7,742,419 | B2 | 6/2010 | Baratakke et al. |
| 2002/0150048 | A1* | 10/2002 | Ha et al. ......................... 370/231 |
| 2005/0276263 | A1* | 12/2005 | Suetsugu et al. .............. 370/389 |
| 2008/0253325 | A1 | 10/2008 | Park et al. |
| 2009/0073884 | A1* | 3/2009 | Kodama et al. ............... 370/235 |

(Continued)

FOREIGN PATENT DOCUMENTS

WO     2010/084172      7/2010

OTHER PUBLICATIONS

Rahul Verma et al. / Information Networks Laboratory, Department of Electrical Engineering, Indian Institute of Technology, Bombay, "Active queue management using adaptive red." Jul. 15, 2002.

(Continued)

*Primary Examiner* — Charles C Jiang
*Assistant Examiner* — George Atkins, Jr.
(74) *Attorney, Agent, or Firm* — Hayes Soloway PC

(57) ABSTRACT

The present invention provides a system and method for reduction of data packet loss for the multiple network interfaces. Particularly, the invention provides a cross layer system for reduction of data packet loss based on dynamic analysis of network conditions. Further, the invention provides a system and method of estimation of network condition and adapting the transmit queue of the multiple interfaces according to channel condition/available bandwidth of the associated network.

18 Claims, 2 Drawing Sheets

(56) References Cited

U.S. PATENT DOCUMENTS

2009/0147737 A1    6/2009    Tacconi et al.
2012/0257535 A1*  10/2012  DeWath et al. ............... 370/253

OTHER PUBLICATIONS

Marissa Borrego, Na Li, Gustavo De Veciana, San-Qi Li, "Congestion Avoidance Using Adaptive Random Marking".

Vitalio et al.. "On the impact of active queue management on VoIP quality of service".

Jian Chen and Victor C.M. Leung, "Applying Active Queue Management to Link Layer Buffers for Real-time Traffic over Third Generation Wireless Networks" Department of Electrical and Computer Engineering the University of British Columbia.

* cited by examiner

SYSTEM AND METHOD FOR REDUCING THE DATA PACKET LOSS EMPLOYING ADAPTIVE TRANSMIT QUEUE LENGTH

FIELD OF THE INVENTION

The present invention relates to the field of telecommunication. Particularly, the invention relates to reduction of data packet loss by adapting transmit queue length based on the network estimation for a cross layer bandwidth aggregation system using multiple active physical interface.

BACKGROUND OF THE INVENTION

Communication networks may comprise a combination of group of a wide area network (WAN), personal area networks (PANS), local area networks (LANs), and campus area networks (CANs).

The WAN, a geographically distributed telecommunication network, enables users around the globe to effectively share and transmit data. It allows businesses to carry out information transaction and business operations. A robust WAN infrastructure is a prerequisite of companies to conduct their business without disruptions. Data transfer through WAN network is widely studied for improving the reduction of the packet loss. The packet loss in the network decreases the quality of services (QoS) and rate of downloading and uploading for applications. The packet loss may cause loss of information transaction through the network. Various researches have been done relating to the reduction of packet loss.

The person skilled in the art knows about bandwidth aggregation, estimation and reduction in packet loss based on proxy based network architecture, client-server architecture i.e. by using a counter component in the other side. The systems in the state of the art are not cross layer aware. The existing systems do not perform any transmit queue adaptation for enhancing the throughput based on the network estimation and either dependent on feedback mechanism. They also require both sender and receiver's participation, or transport layer window size. The existing mechanisms for transmit queue management modifies transmission control protocol (TCP) window size and hence the transmit buffer size. It uses the ECN bit (indication of congestion in network) of IP header as a trigger of queue management. The transmit queue management happens in router.

Some of the prior arts known to us will now be discussed to understand the available technical solutions and shortcomings in the state of the art.

Vitalio et al. in "On the impact of active queue management on VoIP quality of service" discloses a router based congestion control scheme. Active queue management using explicit congestion notification is applied for betterment of QoS in case of VoIP. However, the scheme is tested only for VoIP and also user intervention is desired in order to handle congestion when voice quality deteriorates.

Jian et al. in "Applying Active Queue Management to Link Layer Buffers for Real-time Traffic over Third Generation Wireless Networks" discloses active queue management which is applied to the radio link control layer in 3G wireless system. Input from Harq feedback mechanism is used for Active Queue management. The assessment of channel condition between the User equipment and the Base station is used for congestion control. However, the scheme is applied for queue management of the Physical data units (PDU's) but not exactly for the queue of packets.

Some of the lacunae that exists in the prior art discussed above are that, hitherto, the research necessitated existence of counterpart in the destination which leads to nonuse of multiple interfaces simultaneously to perform the transmit queue management based on the network estimation. These approaches also do not make use of any cross layer technique.

Thus there exists a need to solve the long standing problem of reduction of packet loss based on the dynamic network condition without using any corresponding component at the final destination or at any node, or particular network architecture, or using any network proxy or management node and also without performing any modifications in the physical and data link.

OBJECTIVES OF THE INVENTION

The primary objective of the present invention is to provide a cross layer system communicating over multiple interfaces, which can perform reduction of packet loss by adapting transmit queue length of each active interface based on the network condition of that interface.

Another significant objective of the invention is to adapt the system for simultaneously packet loss reduction along with bandwidth aggregation using active multiple physical interfaces.

An objective of the invention is to provide a method and system for reducing the data packet loss mainly in wireless WAN interfaces.

Another objective of the invention is to provide a method and system that can simultaneously adapt the transmit queue of the multiple interfaces according to the network estimation/available bandwidth of the associated interfaces.

Still another objective of the invention is to provide a method and system for modifying the transmission queue of the multiple interfaces from the use of network estimation.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present invention provides a cross layer system to reduce the packet loss in a poor network condition the said system adapts suitable transmission queue length for each active interface.

In another aspect of the invention is to provide method and system to determine the current transmission queue length associated with each active interface. The ratio of the default transmission queue length and the current transmission queue length is proportional with the ratio of determined bandwidth of previous time-interval (configurable) and the current determined bandwidth.

Still another aspect of the invention is to provide a method and system which estimate the channel/network condition and based on that modifies the transmit queue length associated with each active physical interfaces, and hence reduces the packet loss.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings a few exemplary constructions of the invention; however, it is to be understood that the invention is not limited to the specific methods and system disclosed in the drawings.

DETAILED DESCRIPTION OF THE INVENTION

Figure 1:
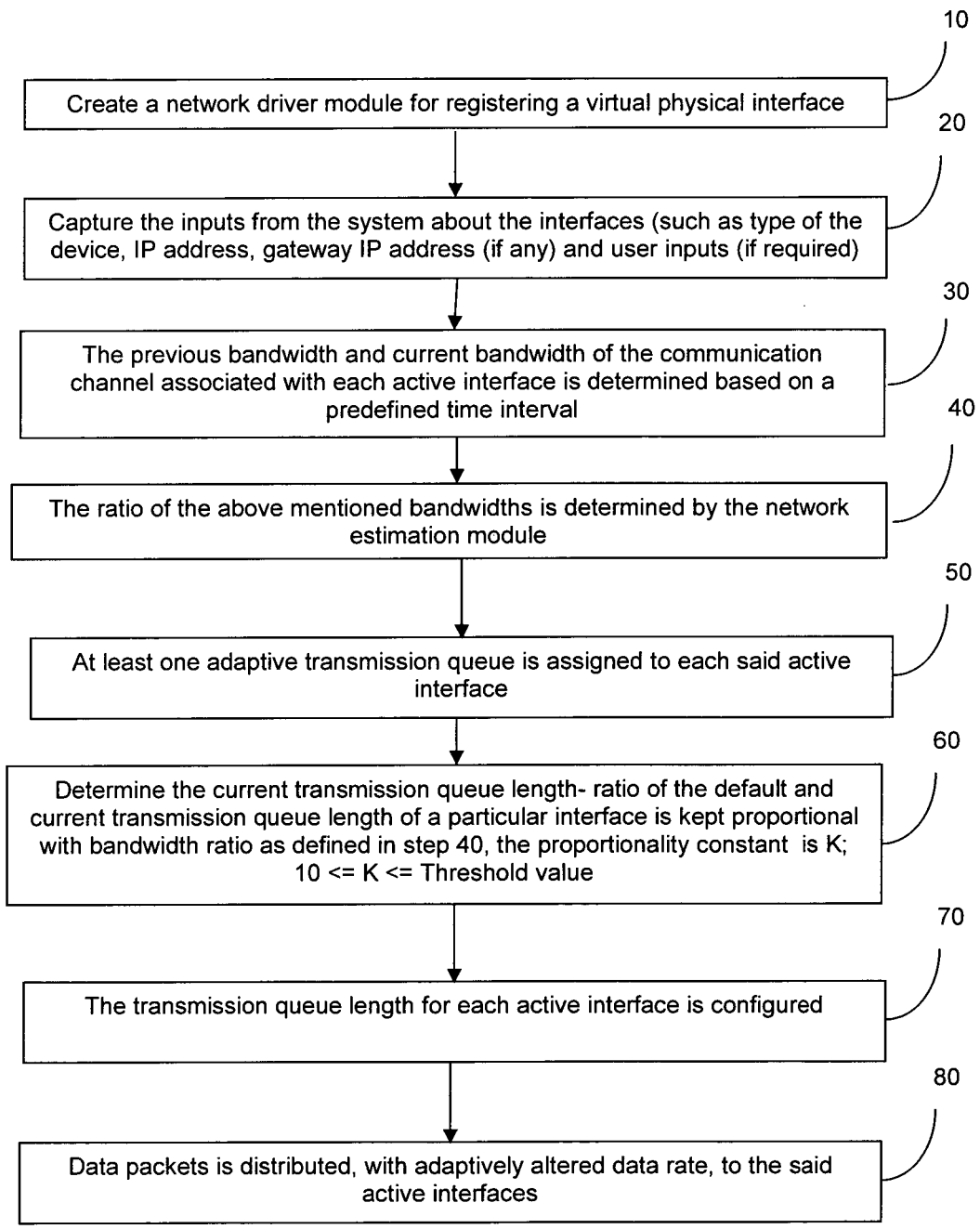
FIG. 1 shows a flow diagram depicting process of reducing data packet loss in a communication network having multiple interfaces.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

A system for reducing data packet loss in a communication network having multiple interfaces, the said system comprises:
  a. at least one network driver module for aggregating the bandwidths of multiple active interfaces and estimating an effective network channel bandwidth ratio associated with each active interface involved in the communication;
  b. a user space component of the network driver module for receiving the user defined inputs;
  c. a transmit queue with adaptive queue length associated with each active interface, each queue having a default queue length;
  d. a network driver module encapsulates network driver of the actual physical interfaces and the module adapts the transmit queue length of the multiple physical interfaces and
  e. at least two physical interfaces adapted to vary the transmit queue length of the multiple interfaces according to availability of bandwidth associated with the interfaces.

Each of the elements of the system of the present application are configured to implement a method for reducing data packet loss in a communication network having multiple interfaces, the method comprises of:
  a. creating a network driver module for registering a virtual physical interface;
  b. capturing plurality of characteristic features associated with each interface and corresponding user inputs;
  c. determining a previous bandwidth and a current bandwidth of a communication channel associated with each active interface based on a predefined configurable time interval;
  d. estimating an effective network channel bandwidth ratio characterized as ratio of bandwidth of the previous time interval and current bandwidth associated with each said active interface involved in the communication;
  e. assigning at least one adaptive transmission queue to each said active interface;
  f. determining a current transmission queue length of each active interface and deriving an effective transmission queue length ratio characterized as a ratio of a default and current transmission queue length of the active interface;
  g. configuring transmission queue length for each active interface so that the effective transmission queue length ratio becomes proportional with the effective network channel bandwidth ratio, wherein the proportionality constant is commensurate with a predefined threshold value; and
  h. transmitting the data packets, with adaptively altered data rate, to the said active interfaces without interception by a network routing component and without seeking routed data status from active interfaces associated with the destination thereof.

In one embodiment of the invention, the network drive module creates a 'virtual physical interface' which encapsulates all existing active physical interfaces present in the computing system. The said system thus does not perform any modifications in the physical and data-link layer of existing physical interface.

FIG. 1 is a flow diagram depicting method for reducing data packet loss in a communication network having multiple interfaces according to one exemplary embodiment of the invention. The process starts at the step 10 creating a network driver module for registering a virtual physical interface. In the steps 20 the system captures plurality of characteristic features of the interfaces in the network that includes type of the device, IP address, gateway IP address of the interfaces and associated user inputs. At the step 30, based on the predefined time interval, estimation of previous bandwidth and a current bandwidth of the communication channel associated with each active interface is determined by the network estimation component inside the network driver module. At the step 40, an effective network channel bandwidth ratio associated with each said active interface involved in the communication by the network is determined by a driver module. At the step 50, at least one adaptive transmission queue is assigned to each said active interface. At the step 60, the current transmission queue of the interfaces is determined by a transmission queue adaptation module inside the network driver.

The ratio of the current transmission queue and the default transmission queue of the each active interface is kept proportional with the ratio of the bandwidth i.e. an effective network channel bandwidth ratio (as determined by step 40) of that interface. The proportionality constant commensurate with a predefined threshold value and has a fixed minimum value. The proportionality constant may be configured based on a maximum network bandwidth that has a fixed minimum value. At the step 70, the transmission queue length for each active interface is configured by transmission queue adaptation module. The process ends at the step 80 wherein data packets are distributed with adaptively altered data rate to the said active interfaces in accordance with estimated bandwidth without interception by a network routing components and without seeking routed data status and as well as packet loss notification from active interfaces associated with the destination thereof.

Figure 2:
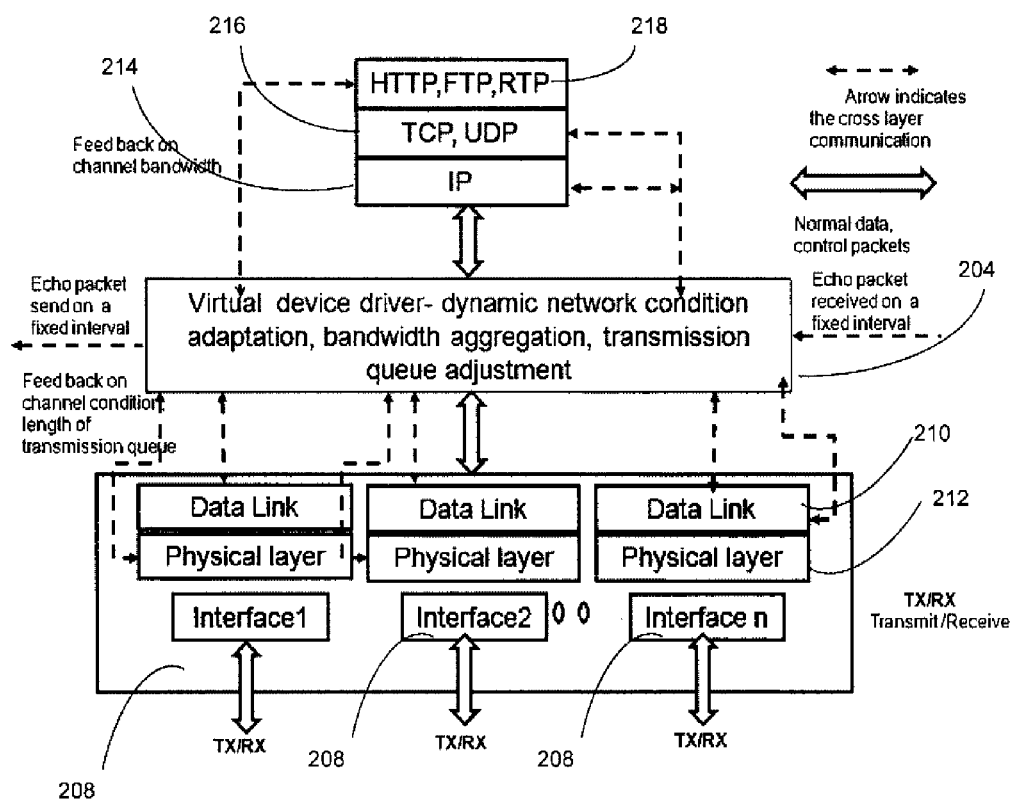
FIG. 2 shows a flow diagram illustrating functional blocks of bandwidth aggregation system providing reduction of packet loss by adapting transmit queue length.

FIG. 2 is a system architecture diagram illustrating the functional blocks for reduction of packet loss from the network. The said system comprises a network driver module 204, a physical interface 208, data link 210, physical layer 212, Internet Protocol (IP) 214, transport protocol header 216, and port number 218. The network driver module 204 further comprises bandwidth aggregator, bandwidth estimator and transmits queue adaptor (not shown in the figure).

The system in accordance with an embodiment may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow for system interactions directly or through the devices. Further, the I/O interface may enable the system to communicate with other computing devices, such as web servers and external data servers. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, non-transitory memory, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules. The modules include routines, programs, objects, components, data structures, etc., which perform particular tasks or implement particular abstract data types.

In one embodiment of the invention, the system further comprises, a user space 206 (not shown in figure), and a kernel space 207 (not shown in the figure).

According to one of the preferred embodiments of the invention, the said user space 206 exposes APIs (application programming interfaces) to gather the user defined inputs, as well as system captured inputs. The said user defined inputs comprise:
a. domain name of the server with a public IP address to which the probe packets are to be sent for estimation of available bandwidth of the network interfaces;
b. time interval for performing network condition estimation and bandwidth determination
c. QoS requirement of an application (optional); and
d. other optional parameters (like enabling or disabling network estimation).

The user inputs are provided by the user through command line. The said system defined inputs comprise;
a. an information about the network interfaces (interface identifier, IP addresses, IP address of gateways if any) available for bandwidth aggregation and estimation. System captured inputs are obtained by doing an ioctl( ) function call with a datagram socket; and
b. an information about the status of the active physical interfaces/devices (i.e. interface is UP, or DOWN, or any change in interface/device status) is also obtained.

In an embodiment of the invention the kernel space 207 acts as a bridge between applications and the actual data processing. The user space 206 and kernel space 208 have a close bonding and both these components exchange control information by using ioctl ( ) function call with a raw socket such as:
a. GETINFO: to collect information available with kernel space module about the network interfaces for aggregation;
b. SETINFO: to pass the information about the available network interfaces to the kernel space module; and
c. NDMINFO (Network Diagnostics): to pass information related to bandwidth estimation to the kernel space module and also to collect the information about the available bandwidth of the network interfaces from the kernel space module.

In an embodiment of the invention the said system acts as a gateway of all the data paths from Internet protocol IP 214 (internet protocol) to the physical layer 212, starting from applications/upper layers and vice-versa. It distributes the data packets while transmitting among the existing active physical interfaces 208 based on the quality of services (QoS) requirement as specified by the application or by using the default configuration. It receives the data from the respective interfaces 208 and passes to the respective applications.

In an embodiment of the invention the network driver module 204 creates a virtual interface and assigns an IP address and netmask to it and adds this interface as the default entry in the routing table. All the application data that comes from upper layer uses this IP address as the source address.

In an embodiment of the invention the network driver module 204 replaces its own IP address with the corresponding active physical interfaces' 208 IP addresses while distributing the data to those interfaces and performs the necessary checksum calculations for internet protocol IP 214 and transport protocols headers 216 as required. During reception it replaces the actual IP addresses of those interfaces with its own IP address and performs the necessary checksum calculations for internet protocol IP 214 and transport protocols headers 216.

In an embodiment of the invention the network driver module 204 uses the active interfaces/devices as its slave network interfaces. It distributes the data packets from application based on some predefined identifiers for example port number 218 (HTTP packet or FTP packet etc.) and quality of services' QoS requirement as specified by the application (optional) through its user space module 206. It sends the distributed data packets directly to the transmit queue of its slave interfaces i.e. the active physical interface 208. It uses packet filtering (net filter) mechanism and associates a hook function for this purpose in the receive path. The hook function is used to filter the packets just after their reception by the active interfaces. The associated hook function of the packet-filter performs the necessary modifications in the data packets, and assembles the data packet before sending to the application.

In an embodiment of the invention the proposed system uses a predefined internet control message protocol (ICMP) echo packet 222 for measuring the network channel condition. The internet control message protocol (ICMP) echo packet is sent to any public IP address (for example-www.google.com) defined by user simultaneously through the existing multiple active interfaces. The destination with the public IP address sends back the echo-reply to active physical interface 208. The Proposed system determines the time differences between the sent ICMP echo and received ICMP echo-reply packets i.e., the round trip time (RTT) for the active interfaces and estimates the network condition. The time difference with a higher value signifies a poor network condition. The system maintains a timer which makes an echo packet to be sent at a fixed time interval (configurable).

In an embodiment of the invention the proposed system also analyses the transport header 216 (TCP) statistics and takes the average RTTs obtained from both the transport header 216 and ICMP probe packet.

Another embodiment of the proposed system as presented here, may enhance the bandwidth of a system significantly by adding up the available bandwidths of the existing active communication interfaces (wired and wireless) by the network driver module 204 without performing any modifications in the physical layer 212 and data link layer 210 of the existing interfaces. At the same time it estimates the channel/network condition associated with each active physical interfaces 208. The system does not need any counterpart or corresponding module in any node including the final destination or end system of the communication link. It can be used for any transport layer protocol 216 like TCP and user datagram protocol (UDP). Importantly, it does not require any service level agreement and a proxy support. It can perform an adaptive bandwidth aggregation.

In a specific embodiment of the invention the result of network estimation modifies the transmission queue length of the multiple interfaces. The proposed system reduces the packet loss in a poor network condition wherein the said system configured to adapt to a suitable transmission queue length for each active interface 208. If the network condition associated with an interface is poor based on the above stated network estimation method, it reduces the transmission queue length (tl) of that interface. It maintains a proportional ratio of the default transmission queue length and the current transmission queue length with previous bandwidth (bw) determined in a predefined time interval (one time interval before the current interval) and the current determined bandwidth.

The transmission queue length of the interface is varied according to the ratio of previous bandwidth and the current bandwidth values determined by the bandwidth estimation module at predefined time interval. Particularly the ratio (R) of previous bandwidth and the current bandwidth is considered to be proportional and multiplied by a constant factor 'K' which is greater than 10 and less than a cutoff saturation value, varying with system to system. The determined mathematical expression for an active physical interface is given below:

new $tx$ queue length=cell[(Default $tx$ queue length)*$R$*$K$]; where

R=cell [current bandwidth/previous bandwidth] 10<=K<=Threshold value (cutoff saturation value), crossing the threshold will not make any impact on the reduction of packet loss.

The network driver module 204 estimates the effective network channel bandwidth ratio associated with each active interface involved in the communication by using a probe packet mechanism wherein the effective network channel bandwidth is a ratio of previous bandwidth and the current bandwidth based on a predefined time interval. The effective networks facilitate to dynamically adapt the transmission queue length to suit the available bandwidth of the communication channel of the corresponding interfaces The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

We claim:

1. A computer implemented method for reducing data packet loss in a communication network having multiple interfaces, the method comprising the steps of:
   capturing, a plurality of characteristic features associated with virtual physical interfaces and corresponding user inputs, wherein each virtual physical interfaces comprises at least one active interface;
   determining, a previous bandwidth and a current bandwidth of a communication channel associated with each active interface based on a predefined configurable time interval;
   aggregating bandwidths of multiple active interfaces via a network driver module residing in a memory, wherein the at least one network driver module has a bandwidth aggregator, a bandwidth estimator and a transmit queue adaptor and estimating an effective bandwidth ratio based on the determined previous and current bandwidth;
   determining, a current transmission queue length based on at least one adaptive transmission queue assigned to each active interface, wherein the at least one adaptive transmission queue has a default transmission queue length;
   estimating, an effective transmission queue length ratio, wherein the effective transmission queue length ratio is a ratio of the default and the current transmission queue lengths of each of the active interface such that the ratio of default transmission queue length and the current transmission queue length is proportional with the determined bandwidth ratio based on the predefined configurable time; and
   modifying, via at least two physical interfaces of the multiple active interfaces, transmission queue length of the multiple active interfaces according to availability of bandwidth associated with the multiple active interfaces, wherein, based on the modified transmission queue length, data packets having an altered data rate are transmitted to the active interfaces.

2. The method of claim 1, wherein the effective network channel bandwidth ratio is a ratio of the previous and current bandwidths, wherein the effective network channel bandwidth ratio and the effective transmission queue length ratio are each dynamically varying and proportional to each other.

3. The method of claim 1, wherein the method further comprises estimating effective network channel bandwidth ratio associated with each active interface involved in the communication using a predefined internet control message protocol (ICMP) echo request packet.

4. The method of claim 1, wherein the effective networks channel bandwidth ratio and the effective transmission queue length ratio to dynamically adapt the effective transmission queue length to reduce the packet loss of the communication channel and enhance throughput.

5. The method of claim 1, wherein the proportionality constant varies from network to network, and wherein the proportionality constant is configured based on a maximum network bandwidth, the maximum network bandwidth having a fixed minimum value.

6. The method of claim 1, wherein the data packets transmission through multiple interfaces defies intervention of one or more counter components and corresponding modules to be hosted at the destination system.

7. The method of claim 1, wherein the data packet transmission through multiple interfaces defies the need to receive one or more packet loss feedback statuses from corresponding active interfaces.

8. The method of claim 1, wherein the step of transmitting does not require any specific characteristics of a specific transport protocol and can be applicable for any transport protocol.

9. The method of claim 1, wherein the method further comprises cross layering communication by providing flexibility in rendering one or more types of transport protocols.

10. A system for reducing data packet loss in a communication network having multiple interfaces, the system comprising:
- at least one network driver module residing in a memory, wherein the at least one network driver module is adapted to aggregate bandwidths of multiple active interfaces and estimate an effective network channel bandwidth ratio associated with each of the multiple active interfaces involved in a communication, the at least one network module having a bandwidth aggregator, a bandwidth estimator and a transmit queue adaptor;
- a user space component of the network driver module adapted to receive a plurality of characteristic features associated with multiple active interfaces and corresponding user defined inputs;
- a transmission queue with adaptive queue length associated with each active interface, each transmission queue having a default queue length wherein the at least one network driver module is adapted to encapsulate a corresponding network driver of the multiple active interfaces, wherein a current transmission queue length is determined corresponding to the adaptive queue length associated with each active interface, and wherein an effective transmission queue length ratio is estimated based on the current transmission queue length and default queue length such that the effective transmission queue length ratio is proportional with the effective network channel bandwidth ratio; and
- at least two physical interfaces of the multiple active interfaces adapted to modify the transmission queue length of the multiple active interfaces according to an availability of bandwidth associated with the multiple active interfaces, and wherein, based on the modified transmission queue length, data packets having an altered data rate are transmitted to the active interfaces.

11. The system of claim 10, wherein the effective network channel bandwidth ratio is a ratio of previous and current bandwidths and an effective transmission queue length ratio is a ratio of default and current transmission queue lengths, wherein each of the effective network channel bandwidth ratio and the effective transmission queue length ratio is dynamically varying and unique to a corresponding data packets receiving active interface.

12. The system of claim 10, wherein the network driver module estimates the effective network channel bandwidth ratio associated with each active interface involved in the communication by using an internet control message protocol (ICMP) echo request packet.

13. The system of claim 11, wherein the effective network channel bandwidth ratio and the effective transmission queue length ratio adapt the transmission queue length to suit an available bandwidth of a communication channel of corresponding the multiple active interfaces.

14. The system of claim 10, wherein data packet transmission through the multiple active interfaces defies intervention of one or more counter components and corresponding modules to be hosted at a destination system.

15. The system of claim 10, wherein data packet transmission through the multiple active interfaces defies the need to receive one or more packet loss feedback statuses from corresponding multiple active interfaces.

16. The system of claim 10, wherein data packet transmission through the multiple active interfaces does not require any specific characteristics of a specific transport protocol and can be applicable for any transport protocol.

17. The system of claim 10, wherein data packet transmission through the multiple active interfaces has cross layered communication, thereby providing flexibility in rendering one or more types of transport protocols.

18. A system for reducing data packet loss in a communication network comprising:
- a plurality of interfaces, each of the plurality of interfaces contained within at least one of a plurality of computerized devices, each of the computerized devices having a processor and a non-transitory memory;
- at least one network driver module, residing in a memory, wherein the at least one network driver module is configured to aggregate bandwidths of multiple active interfaces of the plurality of interfaces, and estimate an effective network channel bandwidth ratio associated with each of the multiple active interfaces involved in a communication, the at least one network module having a bandwidth aggregator, a bandwidth estimator and a transmit queue adaptor;
- a user space component of the network driver module receiving a plurality of characteristic features associated with multiple active interfaces and corresponding user defined inputs;
- a transmission queue with adaptive queue length associated with each active interface, each transmission queue having a default queue length wherein the at least one network driver module is adapted to encapsulate a corresponding network driver of the multiple active interfaces, wherein a current transmission queue length is determined corresponding to the adaptive queue length associated with each active interface, and wherein an effective transmission queue length ratio is estimated based on the current transmission queue length and default queue length such that the effective transmission queue length ratio is proportional with the effective network channel bandwidth ratio; and
- at least two physical interfaces of the multiple active interfaces adapted to modify the transmission queue length of the multiple active interfaces according to an availability of bandwidth associated with the multiple active interfaces, and wherein, based on the modified transmission queue length, data packets having an altered data rate are transmitted to the active interfaces.

* * * * *